United States Patent [19]
Venturati et al.

[11] Patent Number: 5,353,697
[45] Date of Patent: Oct. 11, 1994

[54] ELECTRICAL APPLIANCE FOR THE TREATMENT OF FOOD PRODUCTS, WITH IMPROVED SAFETY DEVICE

[75] Inventors: Gerard Venturati, Collonges; Pierre Selves, Bron; Christian Burgel, Chaponost; Jacques Fouquet, Lyon; Michael Bertrand, deceased, late of Luzinay, all of France, by Maxime Bertrand, Julien Bertrand, Christiane Bertrand, Jean-David Bertrand, heirs

[73] Assignee: Santos S.A., Vaulx en Velin, France

[21] Appl. No.: 77,512

[22] Filed: Jun. 17, 1993

[30] Foreign Application Priority Data

Jun. 17, 1992 [FR] France ................... 92 07607

[51] Int. Cl.$^5$ .................... A23N 1/00; B01F 13/04; A47J 27/09
[52] U.S. Cl. ......................... 99/492; 99/348; 99/510; 241/37.5; 241/92; 366/205; 366/206; 366/314; 366/601
[58] Field of Search ................ 99/325, 468, 486, 492, 99/509–513, 348; 366/197, 199, 200, 205, 206, 314, 347, 601, 349; 241/92, 282.1, 282.2, 37.5

[56] References Cited

U.S. PATENT DOCUMENTS

| | | | |
|---|---|---|---|
| 3,892,365 | 7/1975 | Verdun | 241/92 |
| 4,108,054 | 8/1978 | Klocker et al. | 99/348 |
| 4,269,519 | 5/1981 | Birr | 366/206 |

Primary Examiner—Timothy F. Simone
Attorney, Agent, or Firm—Dowell & Dowell

[57] ABSTRACT

In an electrical appliance for treating food products, the safety device which prevents access of the user's fingers to the tool mounted in the bowl when the motor is operating, is actuated by a rotating cam which, via a rod and ring, acts on the lid of the bowl. It is the lowering of this bowl which effects actuation of the angular immobilizing mechanism connected to the shaft of the motor and/or to the shaft of the tool, as well as control of the contactor connected to the circuit which supplies the motor.

22 Claims, 6 Drawing Sheets

ELECTRICAL APPLIANCE FOR THE TREATMENT OF FOOD PRODUCTS, WITH IMPROVED SAFETY DEVICE

BACKGROUND OF THE INVENTION

1. Field of the Invention

The present invention relates to electric appliances for household or community use, intended for the preparation and treatment of food products in liquid, pasty or solid form, of the mixer/blender, juicer, grinder, kneader, vegetable-cutter, grater, ice-cube breaker type and other like devices, comprising a work tool driven by an electric motor for rotating at the bottom of a vat or bowl closed by a removable lid.

2. History of Related Art

Such appliances are known to be generally equipped with a safety device adapted to avoid any risk of untimely contact of the user's fingers with the work tool while the latter is being driven in rotation. Such a safety device most often employs a contactor connected to the supply circuit of the drive motor, which contactor is arranged to prevent any passage of current in the direction of the motor when the lid is not correctly seated to the vat or bowl.

Document FR-A-2 587 592 (SANTOS) describes a juicer apparatus for preparing fruit or vegetable juice, provided with a safety device which has proved to be of particularly high-performance. This device comprises, in combination:

locking means abutting on the lid to urge it against the edge of the upper opening of the bowl;

an immobilizing mechanism arranged to act elastically on the shaft of the electric motor to prevent rotation thereof;

an electrical contactor which is connected to the supply circuit of the said motor and which tends elastically to maintain the circuit open;

and a cam whose manual rotation effects actuation of the means for locking the lid, releases the immobilizing mechanism and controls closure of the contactor.

In fact, the locking means are formed by two vertical rods diametrally opposite each other with respect to the vat. One of the ends of each of these rods is flared in order to abut against a lateral lug of the lid, while the opposite end carried a ring engaged on a horizontal shaft adapted to move transversely under the effect of rotation of the cam.

It will be readily understood that such an arrangement necessarily involves a precise indexing of the removable lid whose positioning on the open upper part of the vat employs combined movements. The system is therefore not easily acceptable for appliances other than juicers, necessitating frequent fillings and emptyings. Due to the symmetry imposed by the two locking rods, the parts constituting tile safety device must be produced and mounted with precision, particularly concerning tile positioning of the control cam.

Finally, this device, particularly advantageous in the case of a juicer, has proved to be difficult to transpose to an apparatus of different structure, more particularly, mixer/blenders for household or community use.

It is a particular object of tile present invention to overcome this drawback and to further improve the guarantee of reliability of the safety device.

SUMMARY OF THE INVENTION

The appliance according to tile invention is principally noteworthy in that the vat or bowl is axially movable against elastic return means, so that its displacement under the effect of the locking means associated with the removable lid ensures release of the immobilizing mechanism and control of the electrical contactor.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
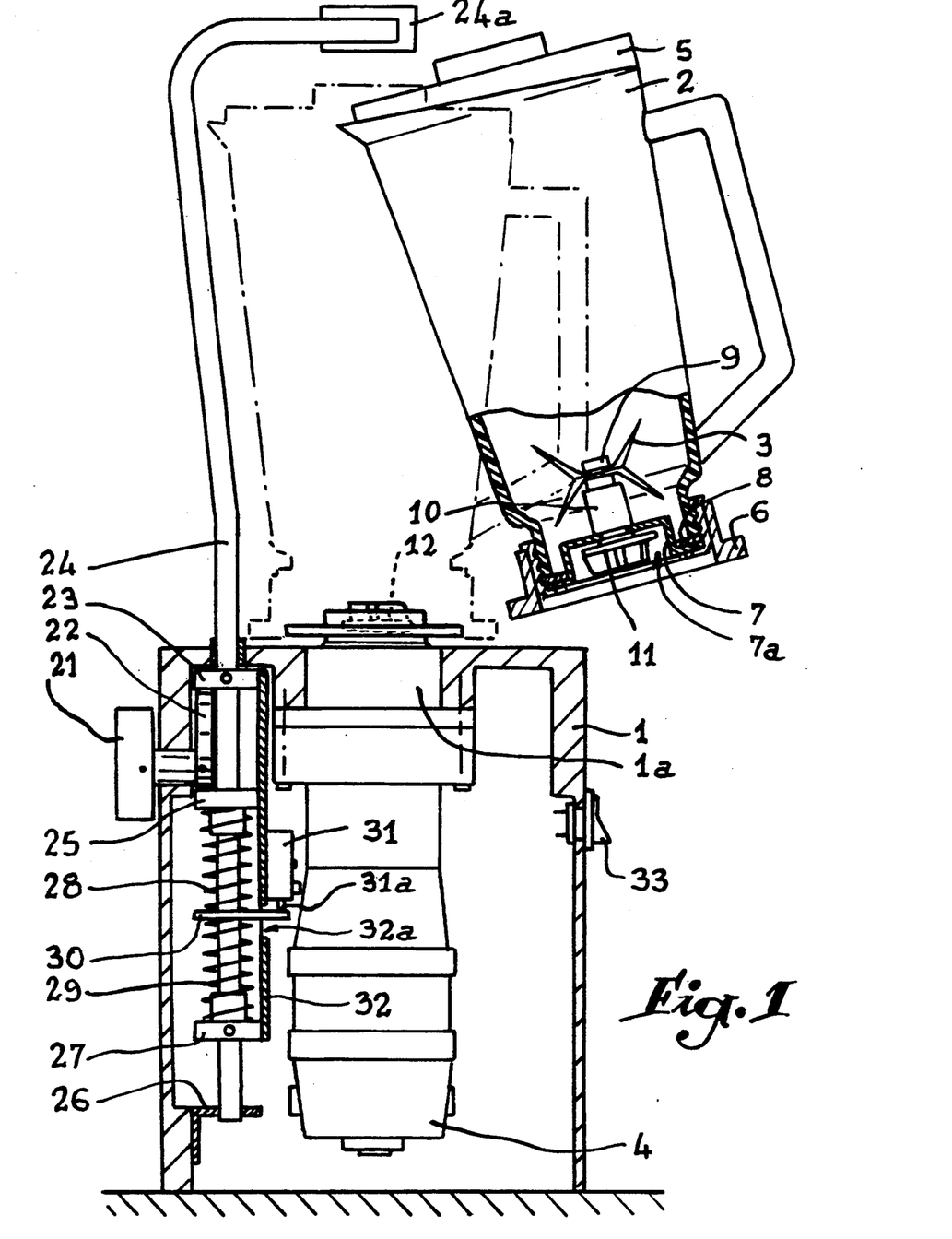
FIG. 1 is a schematic axial section through an appliance according to the invention, shown before rotation of the control cam.
Figure 2:
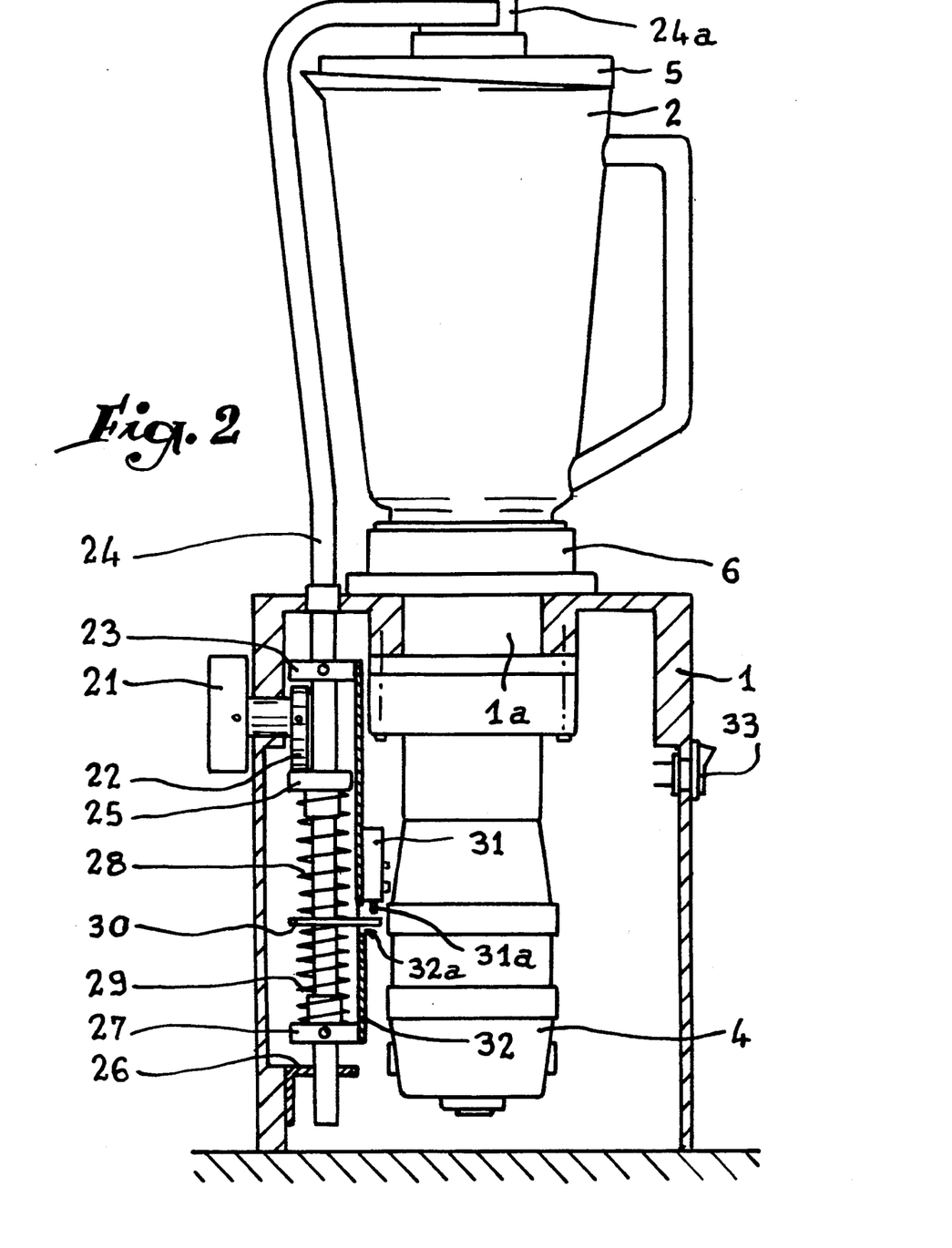
FIG. 2 reproduces FIG. 1 after the cam has been moved.

Referring now to the drawings, and firstly to FIGS. 1 and 2, reference 1 designates the frame of the appliance, which is arranged to support the bowl 2 inside which the work tool 3 rotates and the electric motor 4 for driving the tool 3 in rotation. With the bowl 2 is associated a removable lid 5 shaped to abut against the edge of the upper opening of the bowl.

Figure 3:
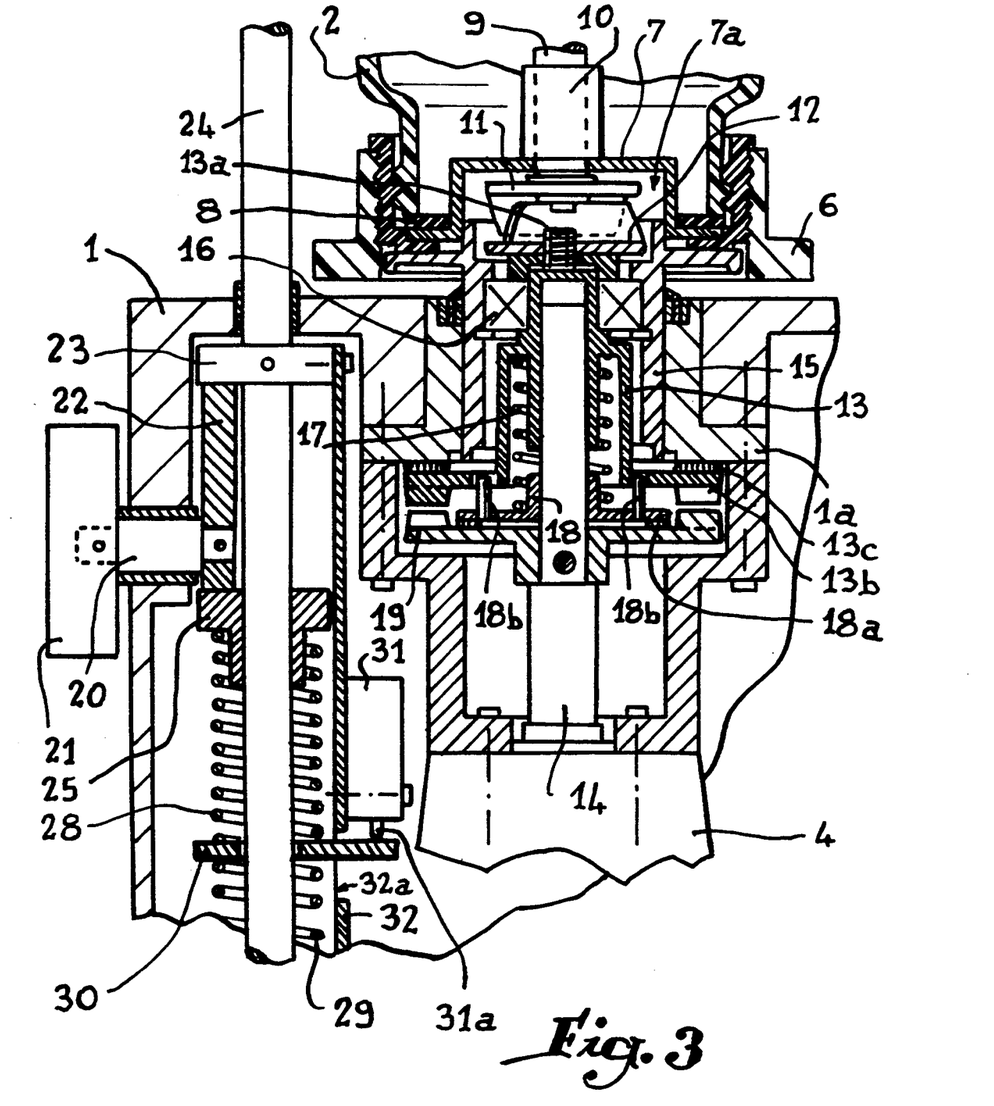
FIGS. 3 and 4 are sections in detail, on a larger scale, illustrating the respective position of the parts of the rotation immobilizing mechanism or brake in FIG. 1 and in FIG. 2, respectively.
Figure 4:
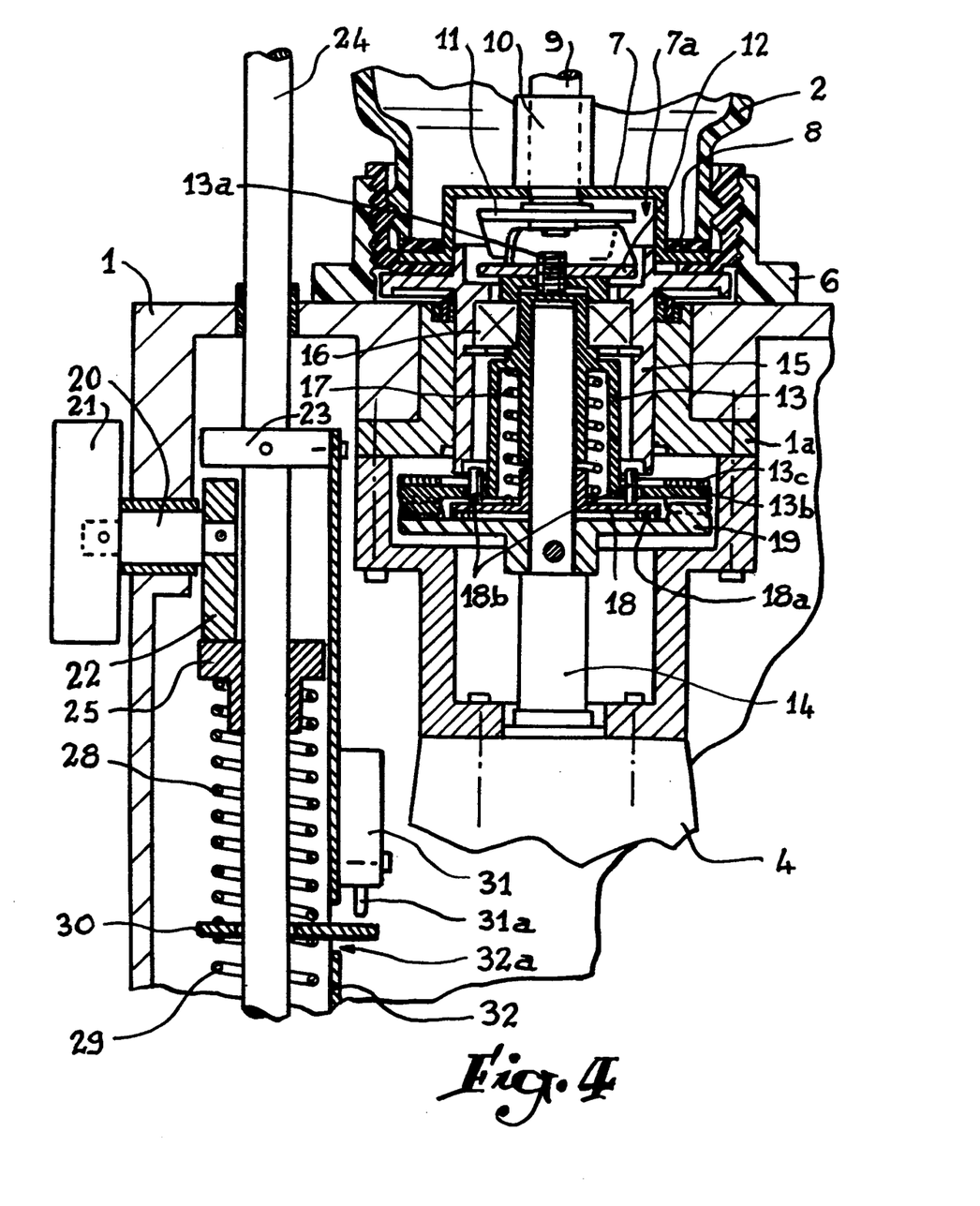

As is shown more particularly in FIGS. 3 and 4, the open base of the bowl 2 is threaded in order to be screwed inside a nut 6 with which are associated an element 7 in the form of a downwardly open dish and an O-ring 8. The shaft 9 to which the tool 3 is mounted freely traverses a guide 10 secured to the element 7 and extend into the housing 7a defined by the dish profile of the element.

Inside this housing 7a, the lower end of the shaft 9 is equipped with a plate 11 provided with fingers adapted to cooperate with the conjugate fingers of a plate 12 fitted to the top of a shaft end 13a secured to an cylindrical hub of a brake element 13, which is rotatably connected to the driveshaft 14 of the motor 4 in the manner described hereinafter. The two plates 11 and 12 constitute a coupling device ensuring a rotatable connection between the shafts 9 and 13a while allowing immediate dismantling of the assembly formed by the bowl 2, nut 6 and element.

This dismountable assembly 2-6-7 rests on the upper part of a sleeve 15 which simultaneously effects centering of the assembly. A roller bearing 16 is interposed between sleeve 15 and the brake hub 13 in order that the latter may freely rotate with respect to the former. The sleeve being retained fixed by any appropriate means (splines, sliding key, etc...).

The brake hub 13 which covers the upper end of the shaft 14 of the motor 4, is resiliently engaged by a spring 17 whose base abuts against a disc 18 mounted freely on the shaft 14. The lower face of the disc 18 is provided with an annular friction lining 18a which the spring 17 tends to maintain applied against a coupling plate 19 pinned on the shaft 14. This plate 19 cooperates with a conjugate plate 13b constituted by the annular base of the brake hub 13. Rods 18b secured the disc 18 connect the disc and the upper coupling plate 13b while allowing free axial movement of these two parts. It will be observed that the upper face of the plate 13b comprises an annular friction lining 13c intended to abut against the lower terminal face of the central hub 1a of the frame 1 which surrounds the sleeve 15.

The lateral wall of frame 1 supports a small horizontal rotatable shaft 20, on the ends of which are fitted a knob 21 and a cam 22 formed by a disc of circular profile mounted in eccentric manner on the shaft 20. The periphery of cam 22 is intended to bear, on the one hand, against a stop 23 pinned on a vertical rod 24 guided in the upper wall of the frame 1, on the other hand, against a lower bushing 25 which is axially slidable along the rod.

As shown in FIGS. 1 and 2, the rod 24 is bent at right angles at its upper end and supports a pressure ring 24a oriented along the axis of the tool 3 so as to abut against the central part of the lid 5 when the latter obturates the opening of the bowl 2. The lower part of the rod 24 is guided by a bracket 26 connected inside the frame 1. The stop 27 is fixed to the lower part of the rod.

Between the lower stop 27 and the sliding bushing 25 are interposed two springs 28 and 29, provided on either side of an actuator 30. The latter is intended to ensure control of a switch 31 connected to the circuit which supplies power to the electric motor 4. This switch 31 is of the monostable type, being arranged so as to maintain the the circuit open for as long as its contact 31a is retained by the actuator 30. In other words, the motor 4 can be supplied with power only when the actuator 30 is lowered to release the contact member 31a which itself lowers under the effect of on elastic means which is associated therewith. It will also be noted that the switch 31 is fixed, not on the frame 1, but on a support piece 32 which rigidly joins the two stops 23 and 27, with the result that it moves vertically at the same time as the rod 24. The support piece 32 is notched at 32a to allow passage of actuator 30.

Functioning of the safety device follows from the foregoing explanations and is readily understood.

In the rest position illustrated in FIGS. 1 and 3, the eccentric part of the cam 22 faces upwardly, with the result that the rod 24 and its pressure ring 24a are in an upper position. The spring 17 maintains the movable parts associated with the bowl 2 and formed by the sleeve 15, the brake hub 13 and the nut 6, in upper position. The two coupling plates 19 and 13b are spaced apart from each other with the result that the work tool 3 is disconnected from the shaft 15 of the motor 4 whilst being blocked by the lining 13c bearing against the lower face of the hub 11. The switch 31 prevents any power supply to the motor 4.

To use the appliance after filling tile bowl 2 and placing the lid 5 in position, the operator must rotate the knob 21 in order to cause the eccentric part of the cam 22 to face downwardly. Rod 24 therefore lowers, the ring 24a then abutting against tile lid 5 which pushes the bowl 2 downwardly against the spring 17. The operational position illustrated in FIGS. 2 and 4, where it may be seen that the nut 6 has come into abutment against the upper face of the frame 1.

Further to this lowering, the plate 13b, of which the lining 13c is no longer in contact with the hub 1a, cooperates with the plate 19, so that the tool 3 is rotatably connected to the shaft 14 through the brake hub 13.

Such lowering stops when the nut 6 is in abutment against the frame 1, but the electrical supply to motor 4 is not yet allowed since the switch 31 mounted to the support piece 32 has descended with the rod 24. The motor 4 cannot be started even if the ON/OFF switch 33 is operated.

It is only when the eccentric part of the cam 22 has completely moved downwardly and has pushed the bushing 25 against the spring 28 that the actuator 30 lowers against the spring 29 and completely releases tile contact 31a, ensuring supply of the motor 4 through the switch 31.

It will be readily understood that, in order to switch off the appliance, it suffices for the user to turn the knob 21 in an opposite direction to return the parts to the position of FIGS. 1 and 3. In the first place, the switch 31 opens tile supply circuit of the motor 4; immediately afterwards, the movable parts associated with the bowl 2 moves upwardly, with the result that the shaft 14, is disconnected from the brake hub 13 and the shaft 9. Also, due to the separation of the coupling plates 13b and 19, the brake hub is immobilized against rotation by the lining 13c bearing against the lower face of the hub 1a.

It will be appreciated that, as soon as the coupling plate 13b has lifted and is therefore no longer in contact with the conjugate plate 19, the lining 13c bears against tile terminal face of the hub 1a and consequently immobilizes the brake hub 13 and the tool 3. This energetic braking action is transmitted by the rods 18b to the disc 18 whose lining 18a is applied against the plate 19 which is thus braked and which consequently immobilizes the shaft 14 of motor 4.

Finally, when the position illustrated in FIGS. 1 and is attained, the bowl 2 whose lid 5 has been released further to the upward displacement of the ring 24a and rod 24, is capable of being removed from the appliance.

In the foregoing description, it has been assumed that the rotation immobilizing mechanism comprised both braking means and coupling means. However, this structure is in no way compulsory and a single system may suffice, by employing solely braking means when the inertia presented by the tool 3 is preponderant, or solely coupling means when the power of the electric motor 4 widely exceeds the effect of inertia of the tool.

Figure 5:
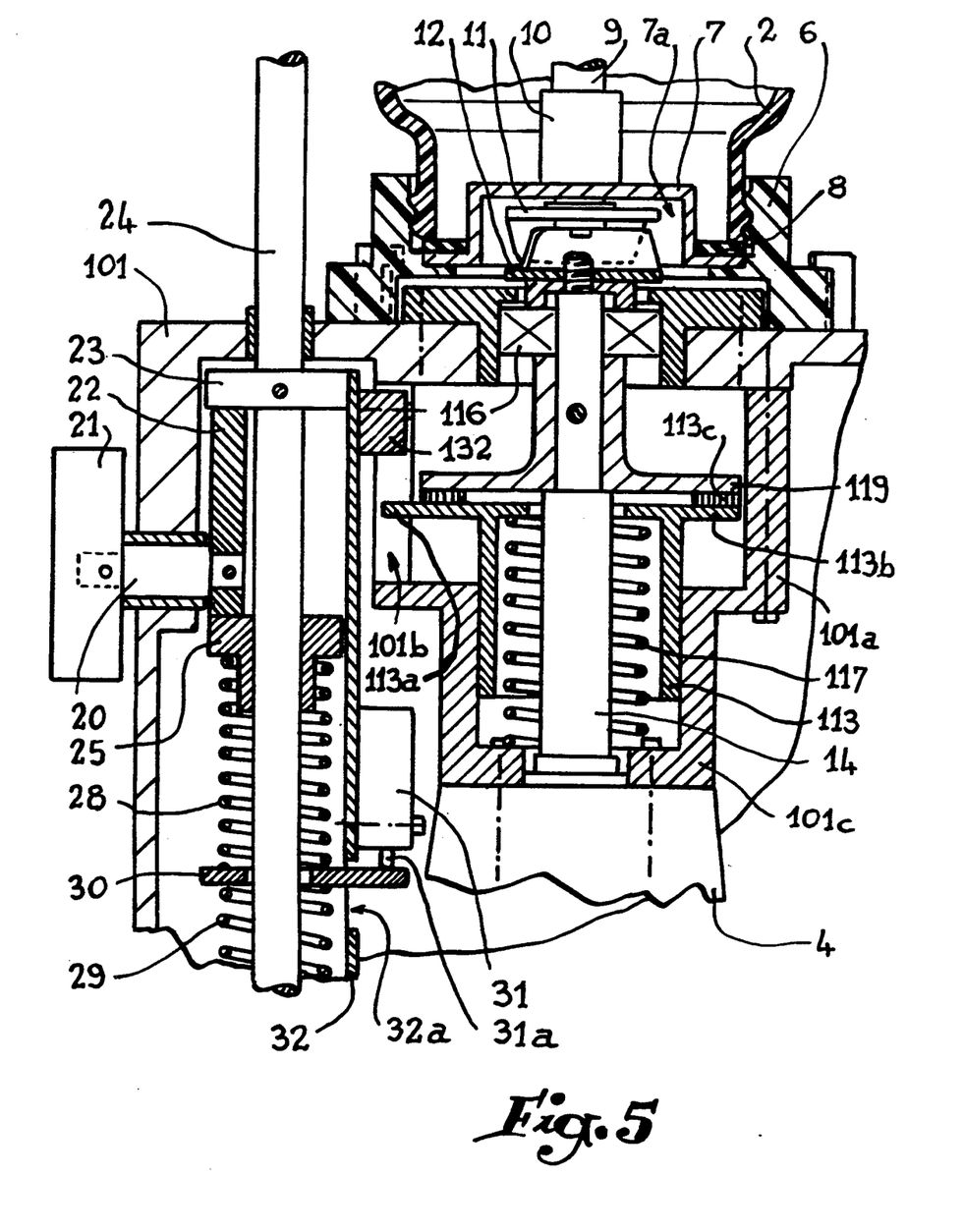
FIGS. 5 and 6 are sections similar to those of FIGS. 3 and 4, but illustrating another embodiment of the invention.
Figure 6:
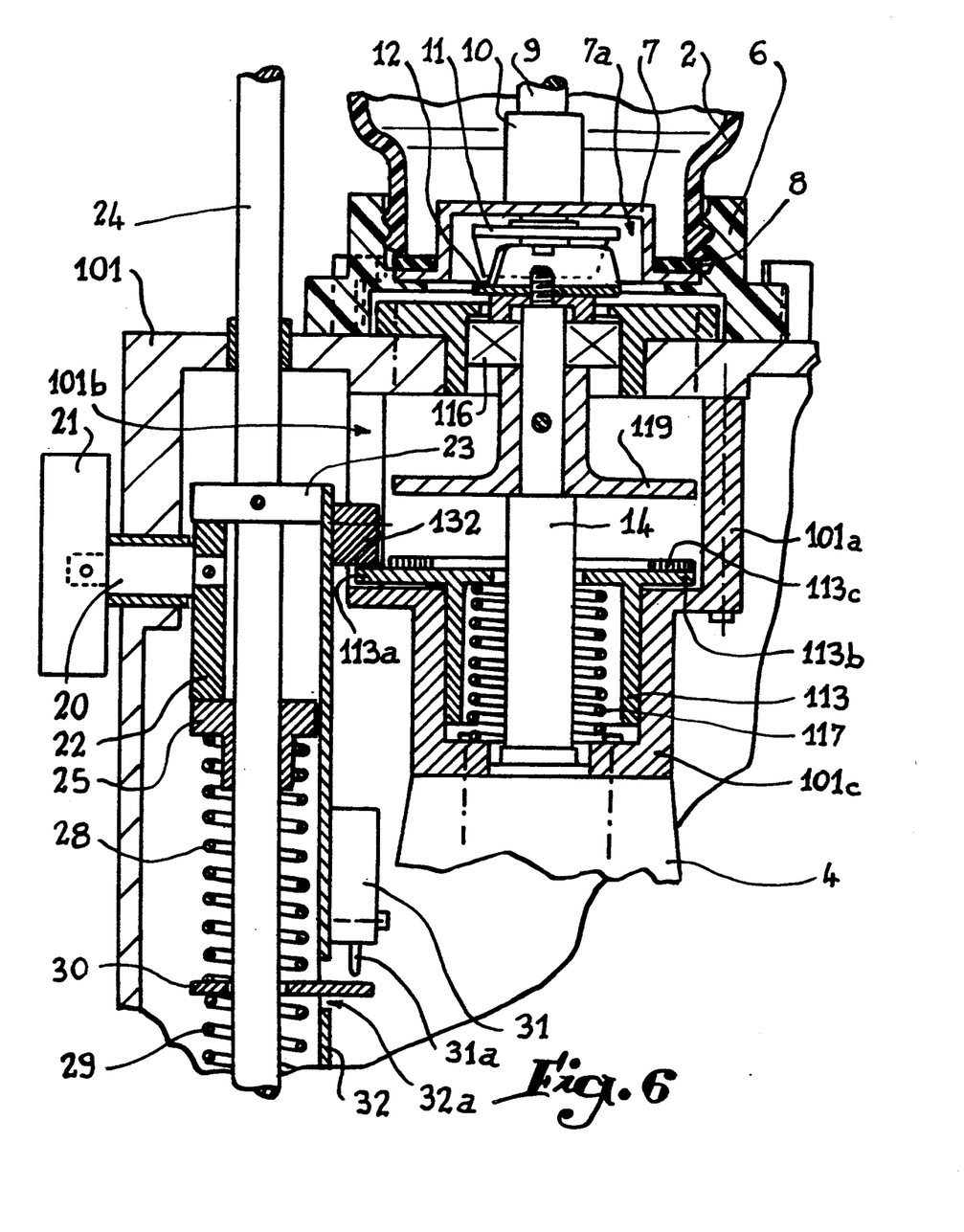

FIGS. 5 and 6 illustrate a variant embodiment of the invention, which includes a cam 22 rotated with the aid of a knob 21 for the vertical displacement of a single rod 24. As in the embodiment of FIGS. 1 to 4, this rod 24 is adapted to maintain the lid 5 applied against the opening of the bowl 2 and it is associated with springs 28 and 29 and with a contactor 30 for controlling the switch 31.

On the contrary, the removable lid 2 is fixed, in that the nut 6 is located in any appropriate manner against the upper face of the frame, here referenced 101. For controlling the rotation immobilizing mechanism, the support piece 32, connected to rod 24, carries a lateral boss 132 profiled to abut, during lowering of this rod 24, against a plate 113b secured to a cylindrical brake hub 113 and equipped with a friction lining 113c. This brake hub 113, immobilized against rotation by engagement of a lateral boss 113a in a vertical slot 101b in the hub 101a of the frame 101, is guided in a lower extension 101c of the hub and receives the action of a spring 117. The latter thus tends to maintain the lining 113c applied against a disc 119 which is pinned on the shaft 14 of the motor 4 between the plate 113b and a roller bearing 116 associated with the upper end of the shaft 14. This upper end is directly secured to the coupling plate 12.

FIG. 6 clearly shows that lowering of the rod 24 ensures the axial displacement of the brake hub 113 whose lining 113c releases the disc 119 and the shaft 14, with the result that the shaft 14 may rotate as soon as the stator of the motor 4 is supplied through the switch 31. Braking is automatically effected as soon as rod 24 rises again.

It goes without saying that this braking system may be replaced by or associated with a coupling system similar to the one described with reference to FIGS. 1 to 4.

It should, moreover, be understood that the foregoing description has been given only by way of example and that it in no way limits the domain of the invention which would not be exceeded by replacing the details of execution described by any other equivalents.

What is claimed is:

1. An appliance for the treatment of food products including a rotatable tool driven by an electric motor mounted within a frame and wherein the tool is positioned adjacent a base portion of a bowl having an upper opening selectively closed by a lid, the appliance comprising:
    a safety device including engaging means for engaging the lid to force the lid to close the upper opening of the bowl;
    an electrical circuit for supplying power to the motor and including a switch means having a contact movable from a first position, wherein power is disconnected from the motor, to a second position, wherein power is disconnected from the motor, to a second position, wherein power is supplied to the motor, said contact of said switch means being normally in said first position;
    a drive shaft assembly rotatably driven by the motor and means for connecting said drive shaft assembly to the tool;
    a brake means mounted in opposition with respect to said drive shaft assembly and being movable between a first position to prevent rotation of said drive shaft assembly and a second position wherein rotation of said drive shaft assembly is permitted, and resilient means normally urging said brake means toward said first position;
    a can means, means extending from the frame for rotating said can means between first and second positions; and
    connecting means connecting said cam means to said locking means and said contact of said switch means, said connecting means being operable so that when said can means is in said first position, said brake means and said contact of said switch means will be in their first positions, and when said cam means is in said second position, said engaging means will force the lid to close the upper opening in the bowl as said brake means and said contact of said switch means are moved to their second position thereby, allowing the drive shaft assembly to rotate the tool.

2. The appliance of claim 1, in which said drive shaft assembly includes a coupling plate mounted to a drive shaft extending from the motor, said brake means including an opposing plate engageable with said coupling plate, and said resilient means normally urging said opposing plate into spaced relationship with said coupling plate when said brake means is in said first position.

3. The appliance of claim 2, including a disc mounted between said opposing plate and said coupling plate, said disc having a frictional surface engaged with said coupling plate.

4. The appliance of claim 3, including means to connect said disc in axially movable and non-rotatable relationship to said opposing plate.

5. The appliance of claim 4, in which said opposing plate includes a brake surface, said brake surface being engageable relative to said frame when said brake means is in said first position.

6. The appliance of claim 5, in which said brake means includes a cylindrical hub mounted in sliding relationship over said drive shaft, said opposing plate extending outwardly from said hub, and said resilient means being partially disposed within said hub.

7. The appliance of claim 6, in which said connect means includes a rod assembly connected to said locking means, said means for connecting said drive shaft assembly to the tool and said brake means being vertically shiftable with the bowl as said engaging means engages the lid to force the lid to close the opening in the bowl, and said rod assembly being engageable by said cam means so as to be vertically reciprocally movable in response to movement of said cam means between said first and second positions thereof.

8. The appliance of claim 7, including means for attaching the switch means to said rod assembly so as to be movable therewith, and an actuator means movably mounted to said rod assembly and being engageable to urge said contact of said switch means to the second position thereof when said cam means is in the second position thereof.

9. The appliance of claim 8, including a pair of opposing springs mounted to said rod assembly in opposing relationship on opposite sides of said actuator means.

10. The appliance of claim 8, in which said rod assembly includes a fixed stop mounted to an elongated rod and a bushing slidable mounted to said rod, said cam means being engageable between said stop and said bushing, and resilient means for urging said bushing into engagement with said cam means.

11. The appliance of claim 1, in which said drive shaft assembly includes a coupling plate mounted to a drive shaft extending from the motor, said brake means including an opposing plate, said resilient means urging said opposing plate into frictional engagement with said coupling plate when said brake means is in said first position.

12. The appliance of claim 11, including a boss member carried by said connecting means, said boss being engageable with said opposing plate to compress said opposing plate against said resilient means and to space said opposing plate from said coupling plate when said cam means is in said second position.

13. The appliance of claim 12, in which said brake means includes a cylindrical housing surrounding said drive shaft, said opposing plate being integrally formed with said cylindrical housing and extending outwardly therefrom.

14. The appliance of claim 13, in which said opposing plate includes a lateral boss extending therefrom, said lateral boss being engageable with said boss member carried by said connecting means.

15. The appliance of claim 14, in which said connecting means includes a rod assembly connected to said locking means, means for mounting said boss member to said rod assembly, and said rod assembly being engageable by said cam means so as to be vertically reciprocally movable in response to movement of said cam means between said first and second positions thereof.

16. The appliance of claim 15, in which the frame includes a guide slot in which said lateral boss of said opposing plate is guidingly received.

17. The appliance of claim 16, including means for attaching the switch means to said rod assembly so as to be movable therewith, and an actuator means movably mounted to said rod assembly and being engageable to urge said contact of said switch means to the second position thereof when said cam means is in the second position thereof.

18. The appliance of claim 17, including a pair of opposing springs mounted to said rod assembly and on opposite sides of said actuator means.

19. The appliance of claim 17, in which said rod assembly includes a fixed stop mounted to an elongated rod and a bushing slidably mounted to said rod, said cam means being engageable between said stop and said bushing, and resilient means for urging said bushing into engagement with said cam means.

20. The appliance of claim 1, in which said drive shaft assembly includes a sleeve means, the base portion of the bowl being supported by said sleeve means, a motor drive shaft, said brake means including a cylindrical hub mounted over said drive shaft, said hub having a plate portion, said brake means also including a disc member having a lower frictional surface, a coupling plate mounted to said drive shaft in opposition to said lower frictional surface of said disc and said plate of said hub, said resilient means disposed between said hub and said disc to thereby urge said disc into engagement with said coupling plate and said plate portion of said hub into spaced relationship to said coupling plate when said brake means is in said first position, and said sleeve means and said hub being axially shiftable relative to said drive shaft by said engaging means to thereby engage said plate portion of said hub with said coupling element when said brake means is in said second position.

21. The electrical appliance of claim 20, in which said plate portion of said hub includes an upper frictional material for abutting a portion of the frame when said brake means is in said first position to thereby prevent rotation of said drive shaft.

22. The electrical appliance of claim 21, including a pin member carried by said disc, said pin member being engaged within openings in said plate portion of said hub.

* * * * *